United States Patent [19]

Hasquenoph

[11] 4,203,226
[45] May 20, 1980

[54] PATH TRACING DEVICE FOR SPREADING OR SPRAYING AGRICULTURAL TREATMENT PRODUCTS OR THE LIKE

[75] Inventor: Denis Hasquenoph, Bussy-Saint-Georges par Lagny, France

[73] Assignee: AGRAM, Saint-Denis, France

[21] Appl. No.: 927,993

[22] Filed: Jul. 26, 1978

[30] Foreign Application Priority Data

Nov. 15, 1977 [FR] France .................................. 77 34228
Jun. 30, 1978 [FR] France .................................. 78 19620

[51] Int. Cl.² ............................................... G01B 3/00
[52] U.S. Cl. ................................................. 33/185 V
[58] Field of Search ..................... 33/185 V, 41 R, 264

[56] References Cited

U.S. PATENT DOCUMENTS

| 976,677 | 11/1910 | Morris | 33/185 V |
|---|---|---|---|
| 1,025,040 | 4/1912 | Wood et al. | 33/185 V |
| 3,027,647 | 4/1962 | Shaffer | 33/264 |

FOREIGN PATENT DOCUMENTS 467496  8/1950  Canada ................................. 33/185 V

*Primary Examiner*—Willis Little
*Attorney, Agent, or Firm*—Michael J. Striker

[57] ABSTRACT

This tracing device adapted to be mounted to the front end of a tractor comprises a lateral jib having a length equal to the width of the lanes on which an agricultural or similar product is to be spread or sprayed. This jib is pivoted about a vertical pintle carried by a framework fixed to the front of the tractor. The outer end of the jib is provided with a jib-supporting and tracing wheel. Alternatively, the jib may be either telescopic or made of two hingedly interconnected frames, with a pair of wheels supporting the hinge and the tracing wheel located at the outer end of the outer frame. A rope attached to the tractor and to the outer end of the jib is provided for constantly keeping the jib on one or the other side of the tractor so as to form with the latter an angle of 90°.

18 Claims, 9 Drawing Figures

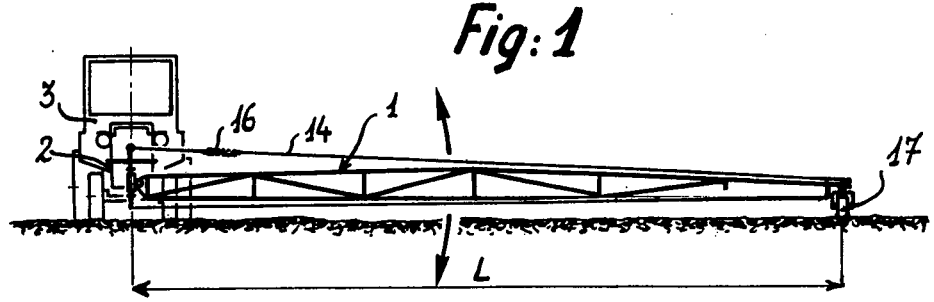
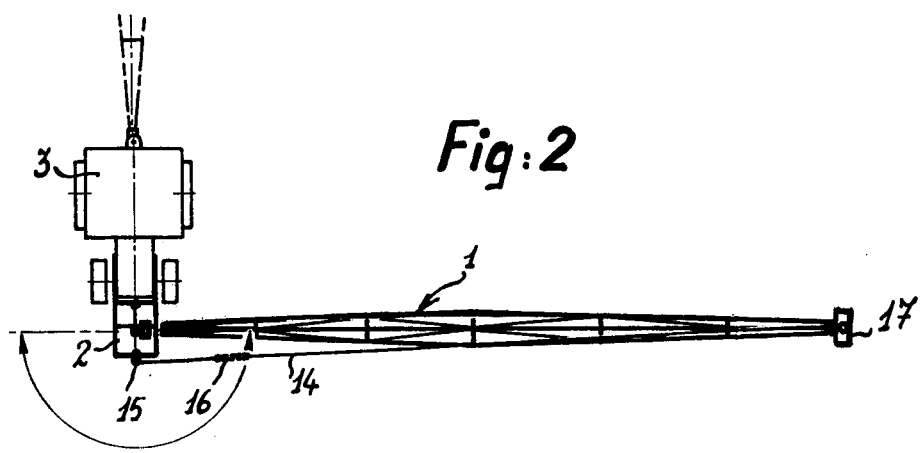
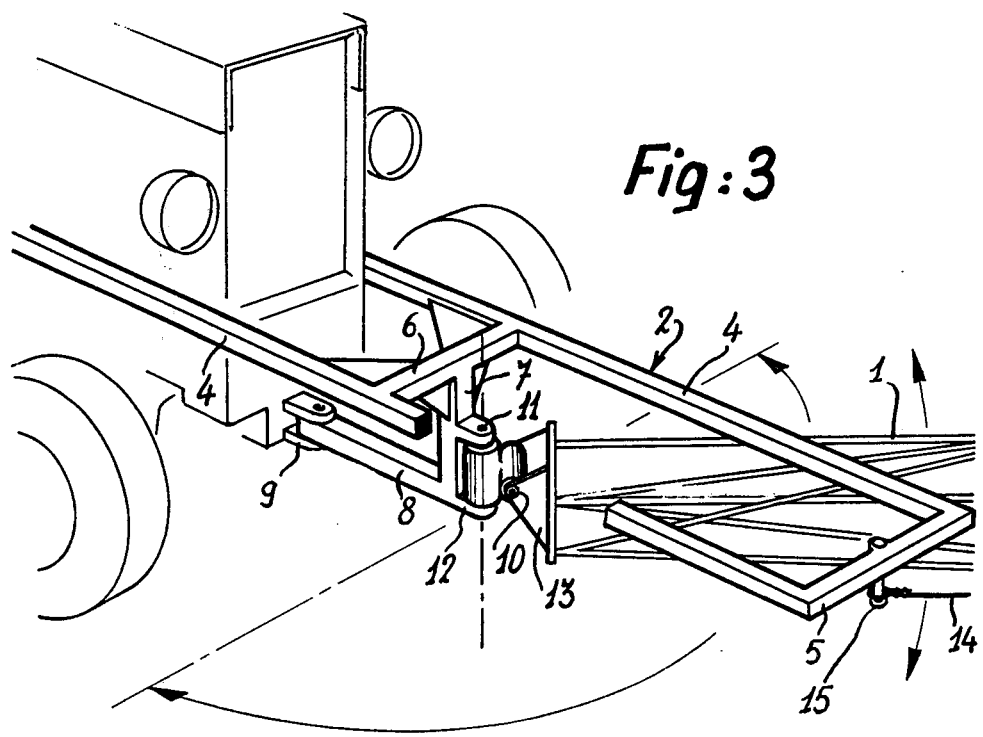

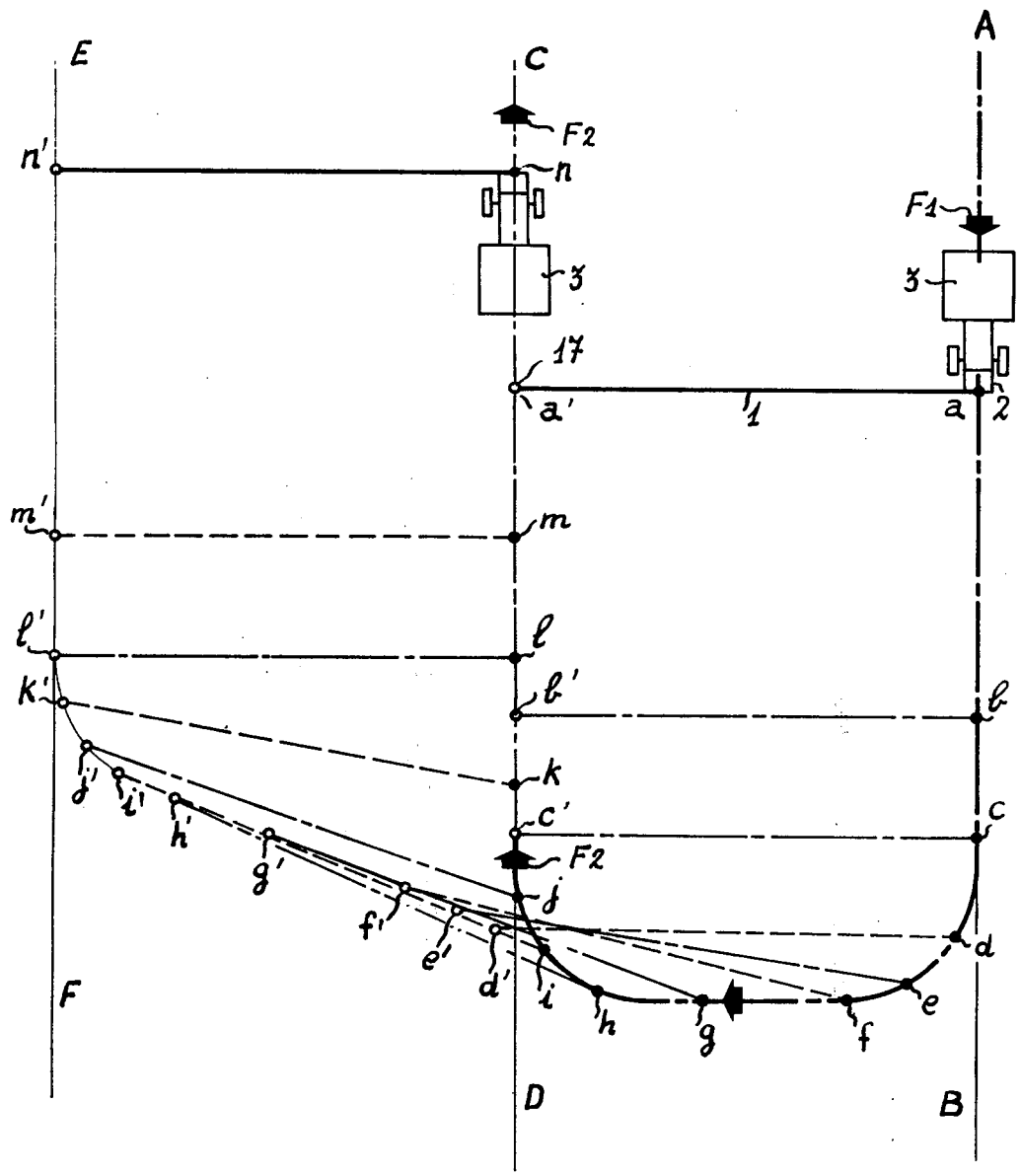
Fig:4

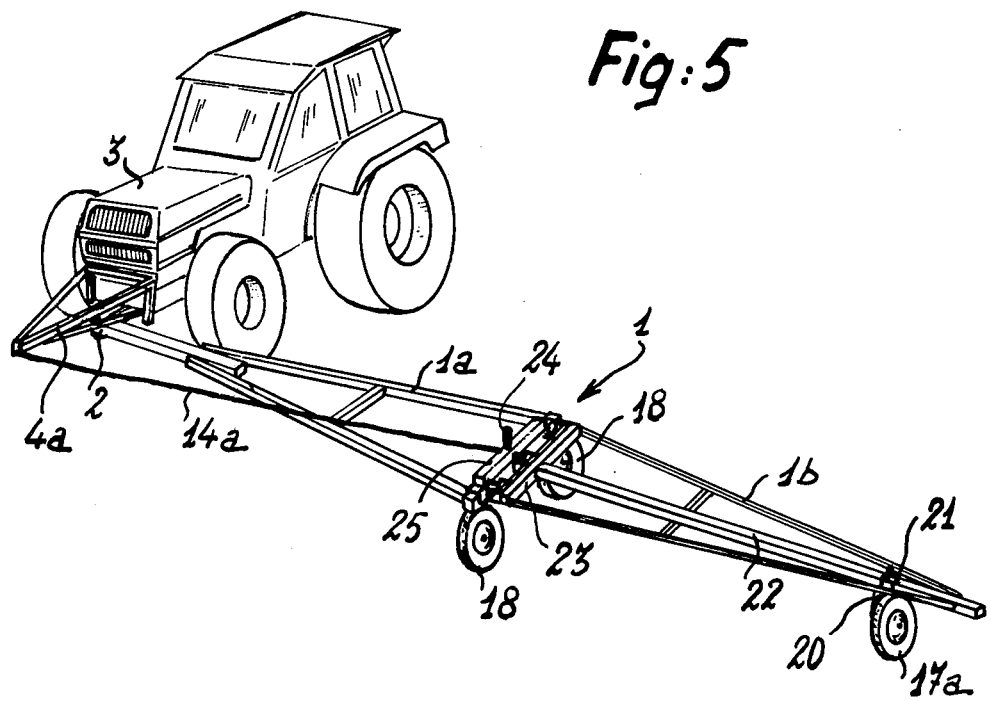
Fig:5
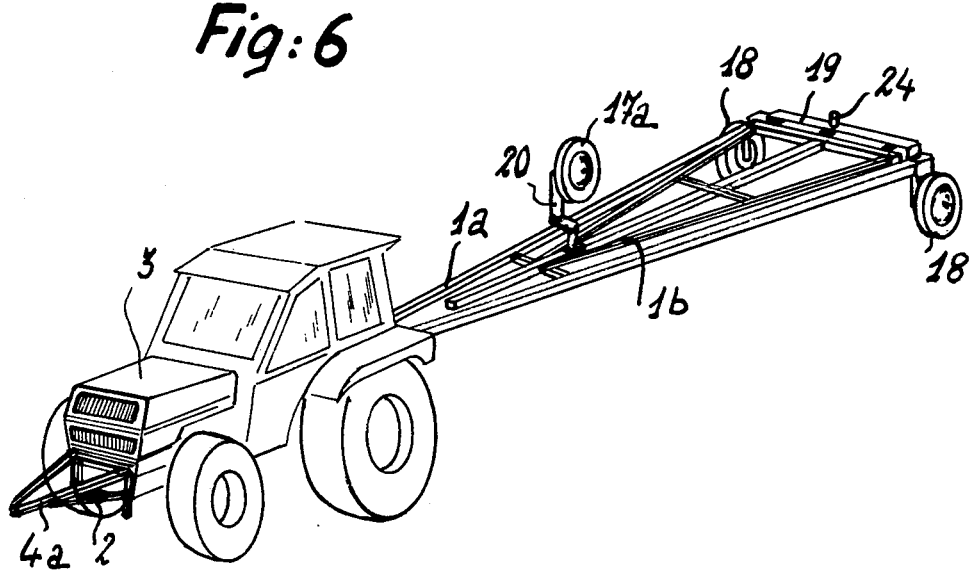
Fig:6

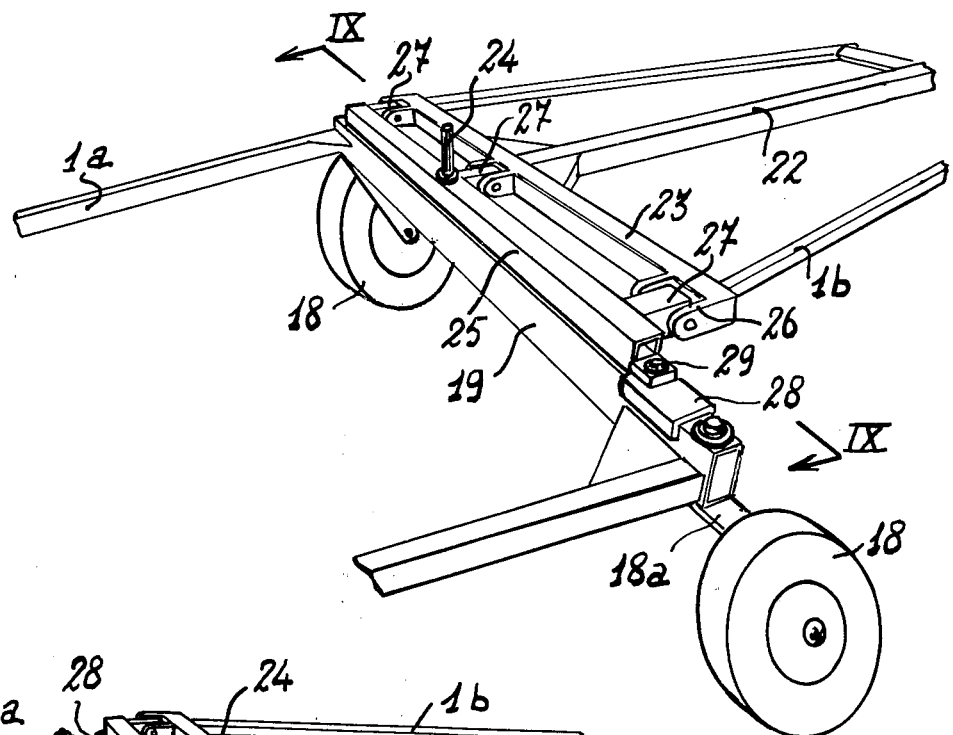
Fig: 7
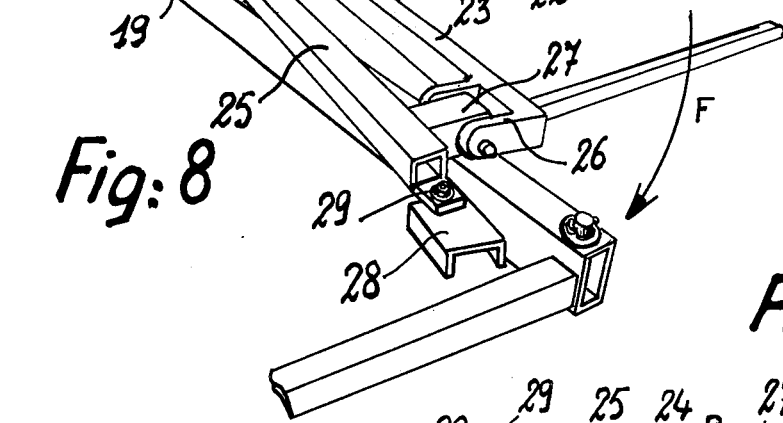
Fig: 8
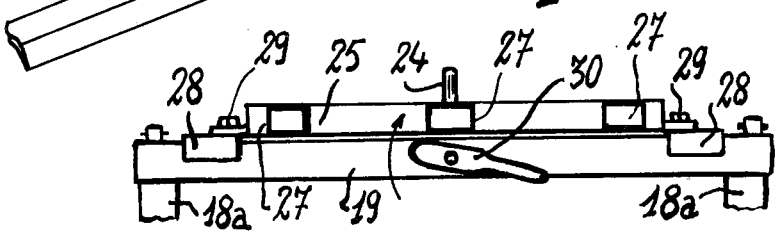
Fig: 9

PATH TRACING DEVICE FOR SPREADING OR SPRAYING AGRICULTURAL TREATMENT PRODUCTS OR THE LIKE

BACKGROUND OF THE INVENTION

Field of the Invention

The present invention is directed to devices adaptable to tractors or other vehicles for tracing on the ground the various lines of a path to be followed for spreading or spraying a treatment product or the like along parallel, relatively wide lanes, notably in agriculture.

In fact, treatments of this kind are applied nowadays by using spreading or spraying systems of relatively great length, for example from ten to twenty-six yards (9 to 24 meters). Therefore, the driver of a tractor equipped with this distributor must cover the corresponding ground area so that the treatment product be applied to parallel lanes having the width of the spreading or spraying ramp while avoiding both a double projection in certain areas and the absence of treatment at others. Consequently, the tractor driver must follow on the ground a series of strictly parallel lines spaced from each other by a distance equal to the width of the treatment lanes, and therefore to the length of the spreading or spraying ramp. However, due to the considerable width of these lanes, this result cannot be achieved without tracing beforehand the lines to be followed during the actual spreading or spraying operation.

Now, hitherto known methods and apparatus available for performing this preliminary tracing operation are not fully satisfactory.

SUMMARY OF THE INVENTION

Therefore, it is the essential object of the present invention to provide a tracing device affording a considerable simplification in the operation of the tractor equipped with this device while ensuring a very accurate tracing of the ground lines at a speed much higher than that afforded by existing methods. On the other hand, this device is adapted for use on all types of ground surfaces and soils, even on soils on which vegetation is growing.

For this purpose, the present device comprises a lateral jib or like out rigger or boom having a length equal to the width of the treatment lanes contemplated, this jib having one end pivoted about a vertical pintle supported by a framework adapted to be mounted to the front of a tractor, so that this jib can pivot freely in front of the tractor in one or the other direction, the opposite or outer end of the jib being provided with a ground-engaging member adapted to trace thereon each one of the lines to be used subsequently as guide means during the actual spreading or spraying operation. On the other hand, retaining means are provided for limiting the liberty of movement of the tracing jib between two operative positions in each one of which the jib is positioned on one or the other side of the tractor and extends at 90° to the longitudinal center line thereof.

Thus, it is particularly easy to drive the tractor during the tracing operation, since the only care required from the driver is to follow each time the line previously traced by the tracing member of the pivoting jib during the preceding run. At the end of each run along a traced line, the tractor is simply driven along a long-radius curve until it rolls on the line he just traced during the preceding run. Now, during this turn, the pivoting jib will tend to skid towards the opposite side of the tractor. Of course, this movement can easily be controlled by the driver since the jib is located at the front of the tractor.

On the other hand, this device is advantageous in that precise traces are obtained since the tracing member is constantly and strictly kept at the same distance from the tractor. However, other features and advantages of the present device will appear as the following description proceeds with reference to the accompanying drawings given by way of illustration, not of limitation. In the drawings:

BRIEF DESCRIPTION OF THE DRAWINGS

FIG. 1 is a front elevation showing a first form of embodiment of the tracing device according to this invention, during its operation;

FIG. 2 is a plane view from above of the same tractor and tracing device assembly;

FIG. 3 is a diagrammatic perspective view of the frame structure supporting the pivoting jib of the present device, said structure being mounted to the front of a tractor;

FIG. 4 is a fragmentary, diagrammatic plane view from above illustrating the lines traced on the ground by means of the device of this invention;

FIG. 5 is a perspective view showing another form of embodiment of the device during its operation;

FIG. 6 is a perspective view showing the method of hauling the device of FIG. 5 in its inoperative or transport position behind the tractor;

FIG. 7 is a perspective view showing details of the means for assembling the two frames constituting the pivoting jib of the device of FIGS. 5 and 6, when these two frames are assembled to each other;

FIG. 8 is a similar view showing the partial uncoupling of the two frames constituting this pivoting jib, and FIG. 9 is a fragmentary section taken along the line IX—IX of FIG. 7 but on a different scale.

DESCRIPTION OF THE PREFERRED EMBODIMENTS

The device illustrated in FIGS. 1-3 comprises a tracing jib 1 pivotally mounted on a frame structure 2 adapted to be secured to the front end of a tractor 3. This frame 2 may consist of welded metal angle members or tubes. As contemplated in this example, the frame 2 may comprise two horizontal longitudinal side members 4 having their rear ends adapted to be fastened on either side of the front end of tractor 3.

These two side members 4 are interconnected at their front and rear ends by cross members 5 and 6, thus forming a frame located at the front of the tractor. Secured to the rear cross member 6 of this frame is a vertical bar 7 supporting the device for pivotally mounting the tracing jib 1. However, at its lower end, this bar 7 is rigid with a horizontal bar 8 also secured to the tractor, for example to a coupling strap 9 provided at the front end of the tractor. Thus, the frame 2 of the device is secured at three points to the tractor, i.e. at the rear ends of the two side members 4 and at the strap 9.

The tracing jib 1 advantageously consists of a trussed beam made of metal sections assembled by means of cross members and rigidly secured to one another by welding. The length L of this jib is equal to the width of the lanes contemplated for the treatment, i.e. the length of the spreading or spraying ramp to be used therefor. Therefore, this length may be for example of the order of 12 meters. However, it is obvious that different lengths may be contemplated as a function of the length of the treatment ramp.

The means for pivotally mounting this jib to the frame 2 comprise two pivot pins disposed at right angles to each other, that is, a horizontal pin 10 and a vertical pin 11. The vertical pin 11 is carried by a strap 12 rigid with the vertical bar 7 supporting it. The horizontal pin 10 is carried by the two webs of a strap 13 rigid with the corresponding end of the tracing jib.

Due to its pivotal mounting about the vertical pin 11, the tracing jib 1 can pivot freely in front of the tractor. However, suitable retaining or stop means are provided for limiting this liberty of pivotal movement in either direction to an angle of 180°, between two operative positions in each of which the tracing jib 1 is disposed on one or the other side of the tractor and at right angles to the longitudinal center line thereof.

In the example illustrated, the retaining means thus provided comprise a rope 14 having one end anchored to the free or outer end of jib 1 and the opposite end attached to a stud 15 at the front end of the frame 2. This rope 14, during the change of direction of the tractor, will pass automatically over the tracing jib 1 so that it will again retain the latter in the novel direction of travel of the tractor. Preferably, this tope incorporates a traction spring 16 permitting a slight backward movement of the tracing jib beyond one or the other of its operative positions, for the purpose of damping out shocks and abnormal efforts likely to be applied to the outer end of jib 1.

At its end away from the tractor 2, the jib 1 bears on the ground through a wheel 17 adapted to constitute the means for tracing lines on the ground. This wheel is adapted to swivel in all directions since its support is mounted for free rotation about a vertical pivot pin at the outer end of the jib. It may be noted that due to the pivotal mounting of this jib about a horizontal pivot pin 10, this wheel 17 can accomodate all ground unevennesses. For the same reason, the present device can be utilized without any inconvenience on a sloping ground, irrespective of the slope direction in relation to the tractor.

To trace on the ground the various lines to be subsequently followed by a tractor equipped with a ramp for spreading or spraying a treatment product, the tracer is firstly driven along a line AB parallel to one of the lateral ends of the field to be traced and spaced from said one end by a distance corresponding to one-half of the width of a treatment lane. This line is followed for example in the direction of the arrow F1 by placing the tracing jib 1 on the side opposed to the field end. Thus, the wheel 17 carried by the jib will trace a line CD while the tractor is driven along the line AB. This line CD is strictly parallel to AB and spaced from the latter by a distance equal to the length of jib 1 and consequently to the width of a treatment lane. FIG. 4 illustrates three successive positions a', b' and c' of the tracing wheel which correspond to three positions a, b, and c of the front end of the tractor.

When the tractor approaches the end of line AB, the driver simply makes an ample turn with it as shown by the points, d, e, f, g, h, i, j and k, so that the tractor is eventually positioned on line CD which it then follows in the reverse direction F2. During this turn, the free end of the tracing jib 1 is caused to skid naturally on the ground, its free or outer end assuming the successive positions d', e', f', g', h', i', j', k' shown in FIG. 4. Therefore, a relative pivotal movement between the jib 1 and tractor 2 takes place, so that at the end of the turn the tracing jib 1 lies on the left-hand side of the tractor, not on the right-hand side as in the preceding run. Thus, when the tractor is subsequently driven along the line CD in the direction of the arrow F2, the tracing wheel 17 will trace a line EF parallel to line CD and spaced therefrom by a distance corresponding to the length of jib 1. FIG. 4 illustrates on the other hand the three successive positions l', m' and n' of the tracing wheel 17 which correspond to positions l, m and n, respectively, of the front end of tractor 3, when the latter is on line CD.

When the tractor is turning at the end of a run, the free end of jib 1 is allowed to skid by the swivel mounting of the tracing wheel 17. It is very easy for the driver to control the relative pivotal movement occurring between the tractor and the tracing jib during this turning movement. This control is easy because the jib is mounted ahead of the front end of the tractor. There is no problem for driving the tractor, for the driver only has to follow the line previously traced by the wheel 17. This is extremely easy since the tractor just has to pass over this line.

Under these conditions, during the actual application of the treatment contemplated, the driver of the tractor utilized for this operation can follow without difficulty the lines previously traced by the wheel 17, the treatment ramp covering the two lanes located on either side of each line. Besides, the device according to the present invention is advantageous in that it permits of performing at the same time the tracing operation and the treatment operation. In this case it is only necessary to fit the present tracing equipment at the front of a tractor of which the rear end is already equipped with a treatment ramp.

From the foregoing, it is clear that the present device is characterized by many advantages in comparison with hitherto known devices utilized for this purpose. The mains advantages lie in the precision of the tracings thus made and also in the ease with which the tracing operation is performed. However, another important advantage lies in the fact that this operation can be accomplished at a greater speed than with any of the hitherto known methods, so that considerable time savings can be achieved.

Of course, the present device should not be construed as being strictly limited by the specific form of embodiment described hereinabove by way of illustration. Thus, the rope 14 limiting the liberty of movement of the tracing jib 1 could be replaced by any other suitable means, such as simple stops limiting the jib movement in either of its two operative positions.

As already mentioned hereinabove, the tracing jib could be constructed in various ways. Possibly, it could comprise a slidably mounted element or section so as to constitute a telescopic assembly adjustable to different lengths. Moreover, this arrangement would permit of reducing the length of this jib during the transport thereof by a tractor along public roads while facilitating these travels. In this respect, it may be noted that the tracing jib may in this case be hitched to the rear end of a tractor.

FIGS. 5 to 9 of the drawings illustrate another form of embodiment of the present device in which the pivoting jib consists of two independent frames or sections elements adapted to be disposed between the triangular frames 1a and 1b. However, it is also possible to have one of these triangular frames made with a telescopic structure in order to increase its length. In either case, it is also possible to increase the length of the lane traced by means of the present device.

What is claimed as new is:

1. A device adapted to be connected to a tractor for tracing on the ground lines of a path to be followed for spreading or spraying treating material along parallel lanes of relatively great width, said device comprising a frame adapted to be fastened at one end to the front end of a tractor; a jib having a length equal to the width of the lanes to be traced; means connecting one end of said jib to said frame for pivoting movement about a vertical pivot axis so that said jib can freely pivot in front of said tractor in one and the other direction; a ground engaging member on the other end of said jib to trace each line to be followed during the subsequent spreading or spraying operation; and retaining means for limiting the liberty of movement of the jib between two operating positions in each of which said jib extends laterally outwards on one or the other side of the tractor and at 90° to the median line thereof, said retaining means comprising a rope interconnecting a portion of said jib spaced from said frame to a portion of said frame spaced further from said one end of said frame than said vertical pivot axis.

2. A tracing device as defined in claim 1, wherein said connecting means comprise a vertical pintle carried by said frame.

3. A tracing device as defined in claim 2, wherein said connecting means includes further horizontally extending pivot means so that said jib may also freely pivot in the vertical direction for accommodating ground unevenness and slope.

4. A tracing device as defined in claim 1, wherein said ground engaging member comprises a wheel carried by the other end of said jib pivotable about a vertical pivot axis.

5. A tracing device as defined in claim 1, and including spring means incorporated in said rope for damping shocks and abnormal stresses exerted on the other end of said jib.

6. A tracing device as defined in claim 1, wherein said jib comprises two successively arranged elongated frame sections, means connecting one end of one of said frame sections to said frame for pivotal movement about a vertical pivot axis and means connecting adjacent ends of said frames for coupling said frame sections during normal operations while permitting the other frame section to pivot to a position in which it overlies said one frame section in order to reduce the overall length of said jib for rod transport, said ground engaging member being mounted on the other end of the other frame section.

7. A tracing device as defined in claim 6, and including a pair of wheels on the other end of said one frame section for supporting the latter.

8. A tracing device as defined in claim 6, wherein said ground engaging member is a wheel, and including mounting means for mounting said wheel on the free end of said other frame section movable from a position engaging the ground to an inverted position for disengaging the wheel from the ground when said other frame section is folded over said one frame section.

9. A tracing device as defined in claim 6, wherein said frame sections have the shape of isoscales triangles assembled along their bases, and wherein said connecting means is disposed in the middle of a cross member constituting the base of said one frame section.

10. A tracing device as defined in claim 9, wherein said connecting means comprise an upright pivot pin on said base of said one frame section, and including an intermediate cross member turnably mounted on said upright pivot pin and horizontally extending pivot means pivotally connecting the base of said other frame section to said intermediate cross member.

11. A tracing device as defined in claim 10 and including locking means on said intermediate cross member for locking the latter relative to the base of said one frame section.

12. A tracing device as defined in claim 11, wherein said locking means comprise a pair of jaws respectively carried at opposite ends of said intermediate cross member and adapted to cap the base of said one frame section, said intermediate cross member being adapted to be lifted in relation to said base of said one frame section to disengage said jaws from the latter to permit pivotal movement of said other frame section relation to said one frame section.

13. A tracing device as defined in claim 12, wherein said jaws carried by said intermediate cross member are secured thereto by bolts adapted to break upon application of excessive stresses to said other frame section.

14. A tracing device as defined in claim 12, and including means for lifting said intermediate cross member for releasing said jaws.

15. A tracing device as defined in claim 14, wherein said lifting means comprise a lever pivotally mounted intermediate its ends on said base of said one frame section and adapted to engage with one end during turning thereof said intermediate cross member to lift the latter.

16. A tracing device as defined in claim 9, wherein said rope is anchored at one end to said frame and at the other end to a middle point of the base of said one frame section.

17. A tracing device as defined in claim 9, wherein said other frame section comprises an elongated rigid member extending along a longitudinal axis thereof and including support means for said ground engaging member movable along said elongated rigid member and fixable thereon in any desired position for changing the width of the traced lanes.

18. A tracing device as defined in claim 1, wherein said jib retaining rope is arranged and connected to said jib to automatically overlie the latter when the tractor turns from one direction of tracing to the opposite direction, so as to keep said jib normal to said new direction of travel of the tractor.

* * * * *